US006907022B2

United States Patent
Dorenbosch

(10) Patent No.: US 6,907,022 B2
(45) Date of Patent: Jun. 14, 2005

(54) METHOD AND APPARATUS IN A PORTABLE SUBSCRIBER UNIT FOR MINIMIZING A CONNECTION SETUP TIME THROUGH A COMMUNICATION NETWORK

(75) Inventor: Jheroen Pieter Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 856 days.

(21) Appl. No.: 09/771,389

(22) Filed: Jan. 27, 2001

(65) Prior Publication Data

US 2002/0101836 A1 Aug. 1, 2002

(51) Int. Cl.⁷ .......................... H04Q 7/24; H04L 12/28; H04L 12/66
(52) U.S. Cl. ....................... 370/338; 370/389; 370/410; 370/352
(58) Field of Search ................................ 370/328, 463, 370/419, 420, 401, 352, 329, 389, 356, 350; 455/416, 519, 517, 518

(56) References Cited

U.S. PATENT DOCUMENTS

| | | | | |
|---|---|---|---|---|
| 5,887,264 A | * | 3/1999 | Kohler | 455/461 |
| 6,104,711 A | | 8/2000 | Voit | 370/352 |
| 6,119,005 A | * | 9/2000 | Smolik | 455/436 |
| 6,564,049 B1 | * | 5/2003 | Dailey | 455/416 |
| 6,574,239 B1 | * | 6/2003 | Dowling et al. | 370/469 |
| 6,754,706 B1 | * | 6/2004 | Swildens et al. | 709/225 |

* cited by examiner

Primary Examiner—Hanh Nguyen
(74) Attorney, Agent, or Firm—R. Louis Breeden

(57) ABSTRACT

In a portable subscriber unit (200) a processor (204) is arranged and programmed to maintain (302) in a memory (208) a list identifying a plurality of devices which are to be connected quickly through a communication network, and to establish (304) a new connection with the communication network. The processor is further arranged and programmed to perform, in response to establishing the new connection, when necessary for pre-programming the communication network to minimize the connection setup time for subsequent connections with the plurality of devices, at least one of the steps of (a) sending names of the plurality of devices to a domain name server (DNS) of the communication network to obtain IP addresses corresponding to the names, thereby causing the DNS to cache the IP addresses of the plurality of devices for faster servicing of subsequent connections, and (b) transmitting a dummy Internet Protocol (IP) packet to said plurality of devices.

16 Claims, 2 Drawing Sheets

METHOD AND APPARATUS IN A PORTABLE SUBSCRIBER UNIT FOR MINIMIZING A CONNECTION SETUP TIME THROUGH A COMMUNICATION NETWORK

FIELD OF THE INVENTION

This invention relates in general to communication networks, and more specifically to a method and apparatus in a portable subscriber unit for minimizing a connection setup time through a communication network.

BACKGROUND OF THE INVENTION

Portable subscriber units, such as laptop computers, personal digital assistants, and wireless messaging units, move about and thus can connect with a network at many different connection points. When an Internet Protocol (IP) connection is made between a portable subscriber unit at a new connection point and a target device via a wide area network, the connection setup time can become lengthy. Two contributing factors are domain name server (DNS) name to IP address conversion, and router path determination. These factors can cause connection setup delays of more than one minute, depending on network traffic and the number of routers used between the new connection point and the target device.

Thus, what is needed is a method and apparatus in a portable subscriber unit for minimizing a connection setup time through a communication network. Preferably, the method and apparatus will operate automatically and transparently to reduce the connection setup time.

DETAILED DESCRIPTION OF THE DRAWINGS

Wide area networks, such as those providing Internet connections, generally use a domain name server (DNS) to convert a name of a target device, e.g., a uniform resource locator (URL), into an Internet Protocol (IP) address. The first time a local DNS has to perform the conversion, communication may be required with several other DNSs in order to locate a DNS which has knowledge of the name and can make the conversion. This can take a substantial amount of time and can delay setup of a connection to the target device. To reduce the conversion delay for subsequent connections to the target device, the local DNS is typically programmed to cache the name and corresponding IP address for a period of time after the first conversion. The period of time is typically on the order of hours.

Similarly, when an IP address appears at a connection point, the network routers must determine how to route the connection to the target device. This can require a substantial amount of communication among the network routers and can introduce additional delay in connection setup. Once the routers have established the path from the connection point to the target device, the routers update their internal routing tables so that subsequent connections between the connection point and the target device can be made quickly. The routing table update information is retained for a time period determined by configuration. A typical value for the time period is thirty minutes.

An aspect of the present invention exploits the fact that both DNS IP address lookup and routing to a target device can occur quickly after the first connection to the target device has been completed. Briefly, the portable subscriber unit 200 (FIG. 2) maintains a list of devices which are to be connected quickly. Whenever the portable subscriber unit 200 establishes a new connection with the network, the portable subscriber unit 200 sends names of the devices to a local DNS and transmits an IP packet to the devices. Preferably, it sends a "dummy" type of packet that does not have side effects, such as a Ping. A Ping is usually implemented using the Internet Control Message Protocol (ICMP) "ECHO" facility. In this way the local DNS and the network routers advantageously become pre-programmed such that the setup time for subsequent connections to any of the devices is minimized.

Figure 1:
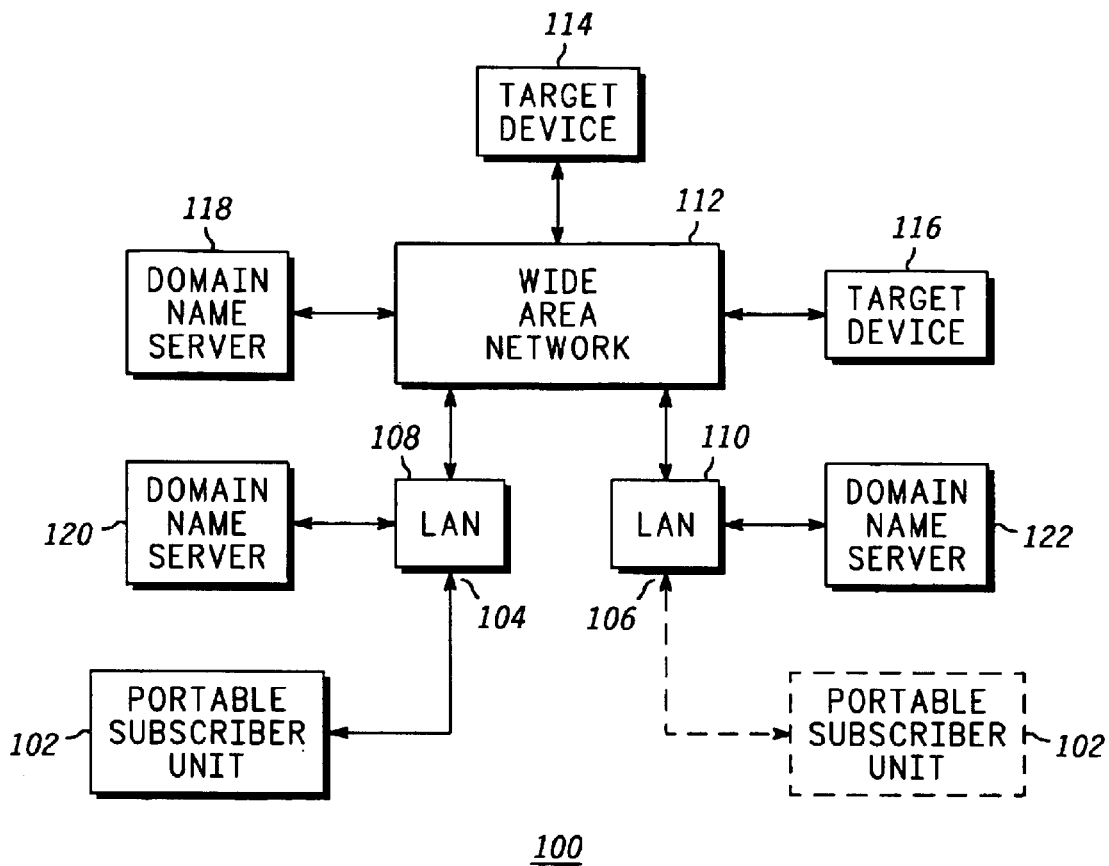
FIG. 1 is an electrical block diagram of an exemplary prior art communication network.

FIG. 1 is an electrical block diagram of an exemplary prior art communication network 100. The communication network 100 comprises a prior art portable subscriber unit 102, e.g., a laptop computer, a personal digital assistant, or a wireless messaging unit, to name a few devices. The communication network 100 further comprises first and second local area networks (LANs) 108, 110 coupled to a wide area network (WAN) 112, such as the Internet. Target devices 114, 116, such as servers, also are coupled to the WAN 112. Domain name servers 118, 120, 122 are coupled to the network at various points for providing name to IP address conversion. The portable subscriber unit 102 is depicted coupled to the LAN 108 at a first connection point 104 at a first time.

Because of its portability, the portable subscriber unit 102 is also depicted coupled to the LAN 110 at a second connection point 106 at a second time. Whenever the prior art portable subscriber unit 102 changes to a new connection point and sends the URL of a desired target device to the local DNS (e.g., DNS 122), the local DNS typically has to obtain the corresponding IP address from another DNS (e.g., DNS 118) in the network. Also, given the IP address, the network routers (not shown) have to determine a path to the target device. As discussed herein above, these call setup tasks can greatly delay a first connection attempt from a new connection point to a target device. It will be appreciated that many other configurations can be substituted for the communication network 100. For example, the LANs 108, 110 can be omitted, and the subscriber unit 102 can be connected directly to the wide area network 112. Alternatively, the LANs 108, 110 can be subnet LANs of a common, larger LAN.

Figure 2:
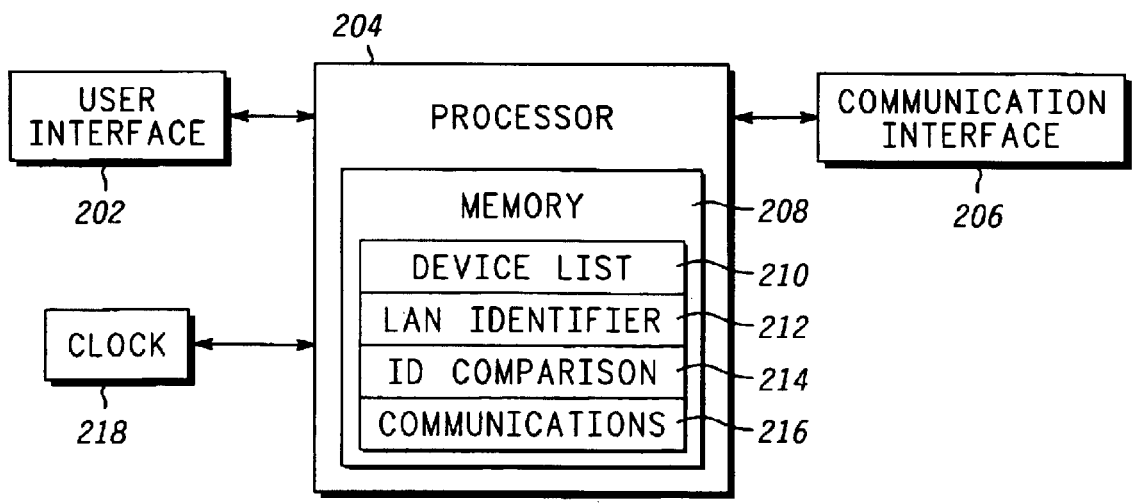
FIG. 2 is an electrical block diagram of an exemplary portable subscriber unit in accordance with the present invention.

FIG. 2 is an electrical block diagram of an exemplary portable subscriber unit 200 in accordance with the present invention. The portable subscriber unit 200 comprises a conventional processor 204 for controlling the portable subscriber unit 200. The processor 204 is coupled to a user interface 202 for interfacing with a user. The user interface 202 preferably includes a conventional keyboard and display, but may vary depending upon the function of the portable subscriber unit 200. The processor 204 is also coupled to a conventional communication interface 206 for communicating with the communication network 100. The portable subscriber unit 200 also includes a conventional clock 218 coupled to the processor 204 for providing a time of day thereto. The processor 204 includes a conventional memory 208 for programming the processor 204 in accordance with the present invention. The memory 208 comprises a device list 210 identifying a plurality of devices which are to be connected quickly through the communication network 100. The memory 208 further comprises a new connection program 215 for sending the name (URL or URI) of each device to the local DNS, and/or a "dummy" IP packet to each of the plurality of devices, in response to establishing a new connection with the communication network 100, when necessary for pre-programming the communication network 100 to minimize the connection setup time for subsequent connections with the plurality of devices. The dummy IP packet can be any packet which will not be confused with user data or otherwise cause harm. Dummy packets can be sent to the UDP echo port or can be the ICMP Ping packet, the latter being sent if a response is desired from the device. The device list 210 can also be programmed by an external device via the communication interface 206.

The device list 210 can be maintained by the processor 204 in one of several ways. A first option is for the processor 204 the maintain the device list 210 by identifying a subset of devices with which the portable subscriber unit 200 has recently communicated. This can be done, for example, by time stamping each communication with a device and keeping the device identifier in the device list 210 for a predetermined time, e.g., one hour. A second option is for the processor 204 to maintain the device list 210 by identifying a predetermined number of devices with which the portable subscriber unit 200 has most frequently communicated over a predetermined time period. This can be done, for example, by time stamping each communication with a device, counting the number of communications with each device over the predetermined time period, e.g., during the last hour, and retaining in the device list 210 the devices corresponding to the top five counts. A third option is for the processor 204 to maintain the device list 210 by allowing the user of the portable subscriber unit 200 to specify through the user interface 202 the plurality of devices which are to be connected quickly through the wide area network. For example, the user can specify the URLs of the devices he/she expects to contact most often.

The memory 208 further comprises a LAN identifier 212 for identifying a most recently connected LAN. In addition, the memory 208 includes an ID comparison program 214 for programming the processor 204, after establishing a connection with a new LAN, to compare the identifier of the new LAN with the previously stored LAN identifier 212 of the most recently connected old LAN, and to determine that sending the dummy IP packet is not necessary when the identifier of the new LAN is equal to the previously stored LAN identifier 212. The ID comparison program also programs the processor 204 to determine that sending the dummy IP packet is not necessary when the LAN identifier 212 and the identifier of the new LAN indicate through well-known techniques that the new LAN and the old LAN are sub-networks of a single LAN. The memory 208 also includes a communications program 216 for programming the processor 204 to handle the communications between the portable subscriber unit 200 and the communication network 100 through well-known techniques.

Figure 3:
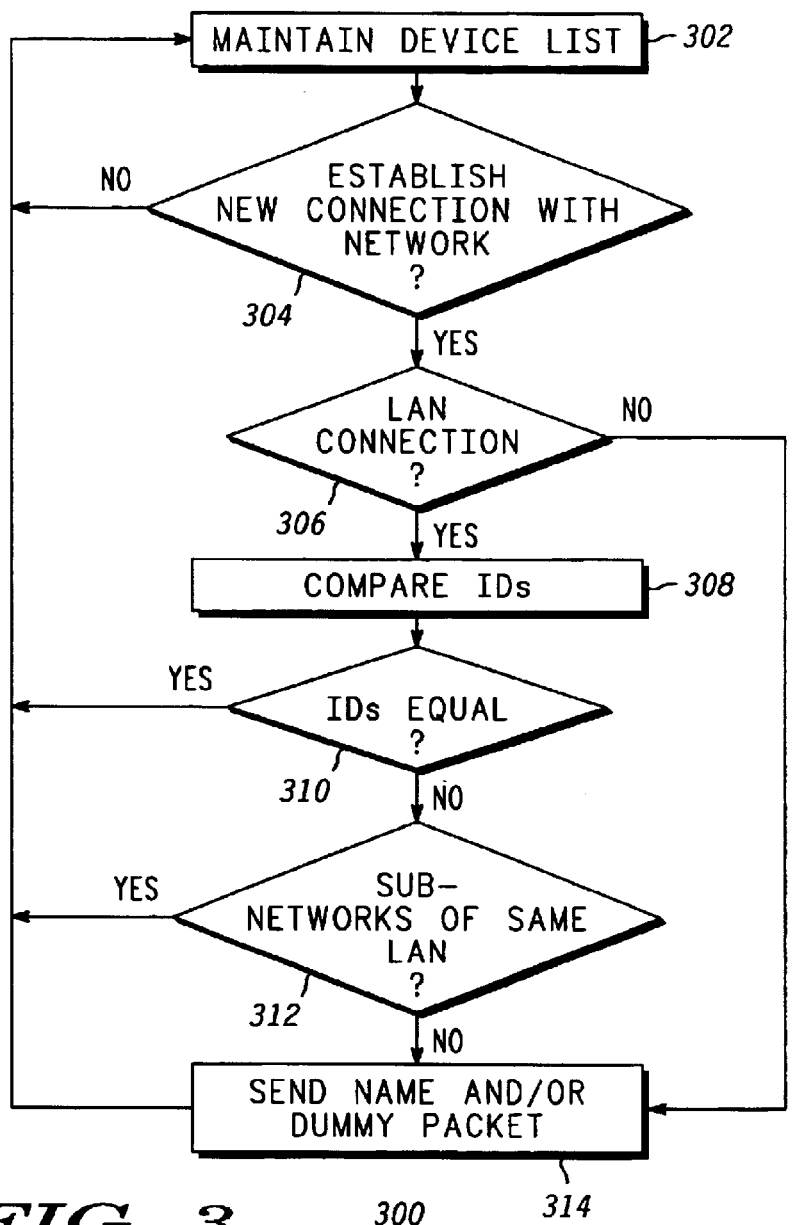
FIGS. 3 and 4 are exemplary flow diagrams depicting operation of the portable subscriber unit in accordance with the present invention.

FIG. 3 is an exemplary flow diagram 300 depicting an operation of the portable subscriber unit 200 in accordance with the present invention. The flow begins with the processor 204 maintaining 302 the device list 210 identifying a plurality of devices which are to be connected quickly through the communication network 100. The processor 204 then checks 304 whether the portable subscriber unit 200 has established a new connection with the communication network 100. If not, the flow loops back to step 302. If, on the other hand, the portable subscriber unit 200 has established a new connection with the communication network 100, then the processor 204 checks 306 whether the new connection is to a LAN. If not, the processor 204 will send 314 for each device at least one of a name and a dummy packet. The name (URL or URI) of each device of the plurality of devices, if sent, is sent to the local DNS to obtain the IP address of the device and to cause the local DNS to cache the name and corresponding IP address for quick retrieval for subsequent connections to the device. The dummy packet, if sent, is sent to each of the plurality of devices in the device list 210. This advantageously pre-programs the network routers with the path to the device for quick routing of subsequent connections to the device. It will be appreciated that in many instances it will be advantageous to send both the name to the DNS and the dummy packet to each device to minimize connection setup time. The flow then returns to step 302.

If, on the other hand, the new connection is to a LAN, the processor 204 compares 308 the identifier of the "new" LAN with the LAN identifier 212 stored for identifying the most recently connected LAN. The processor 204 then checks whether the two identifiers are equal (indicating that the new connection is with the same old LAN). If not, the processor 204 checks 312 whether the old and new connections are with sub-networks of the same LAN. If either of the checks 310, 312 is positive, sending the name and/or dummy packet is not necessary (because the LAN has not changed), and the flow returns to step 302. If both of the checks 310, 312 are negative, the LAN has changed, and sending the name and/or dummy packet is necessary, so the flow moves to step 314 to do that.

Figure 4:
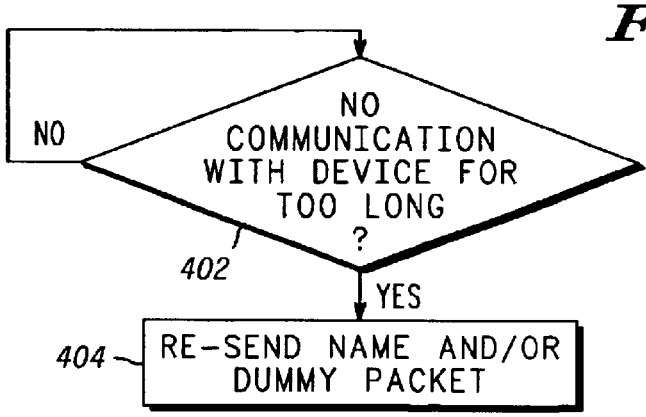

FIG. 4 is an exemplary flow diagram 400 depicting an operation of the portable subscriber unit 200 in accordance with the present invention. The flow begins with the processor 204 checking 402 whether any of the devices in the device list 210 have gone without communication for more than a predetermined length of time. If not, the processor 204 continues to check 402 periodically. If, on the other hand, the processor 204 determines that it has not communicated with a device for longer than the predetermined length of time, the processor 204 re-sends 404 the device name to the local DNS and/or the dummy packet to the device. Sending both will advantageously ensure that the local DNS and the network routers will remain pre-programmed for minimum connection setup time to the device.

It should be clear from the preceding disclosure that the present invention provides a method and apparatus in a portable subscriber unit for minimizing a connection setup time in a communication network comprising a wide area network. Advantageously, the present invention operates automatically and transparently to minimize the connection setup time.

Many modifications and variations of the present invention are possible in light of the above teachings. Thus, it is to be understood that, within the scope of the appended claims, the invention can be practiced other than as specifically described herein above.

What is claimed is:

1. A method in a portable subscriber unit for minimizing a connection setup time in a communication network comprising a wide area network, the method comprising the steps of:

maintaining in a memory of the portable subscriber unit a list identifying a plurality of devices which are to be connected quickly through the communication network;

establishing a new connection with the communication network; and performing, in response to establishing said new connection, when necessary for pre-programming the communication network to minimize the connection setup time for subsequent connections with said plurality of devices, at least one of the steps of:
sending names of the plurality of devices to a domain name server (DNS) of the communication network to obtain Internet Protocol (IP) addresses corresponding to the names, thereby causing the DNS to cache the IP addresses of the plurality of devices for faster servicing of subsequent connections; and
transmitting a dummy IP packet to said plurality of devices,
wherein the step of establishing the new connection comprises the steps of:
establishing the new connection via a new local area network (LAN); and
comparing an identifier of the new LAN with a previously stored identifier of a most recently connected old LAN, and
wherein the method further comprises, prior to the performing step, the step of determining that the sending and transmitting steps are not necessary when the identifier of the new LAN is equal to the previously stored identifier of a most recently connected old LAN.

2. The method of claim 1, wherein the performing step comprises the step of performing both the sending step and the transmitting step.

3. The method of claim 1, further comprising the step of repeating the performing step with regard to ones of said plurality of devices with which the portable subscriber unit has not communicated for a predetermined length of time.

4. The method of claim 1, wherein the step of maintaining said list comprises the step of identifying a subset of devices with which the portable subscriber unit has recently communicated.

5. The method of claim 1, wherein the step of maintaining said list comprises the step of identifying a predetermined number of devices with which the portable subscriber unit has most frequently communicated over a predetermined time period.

6. The method of claim 1, wherein the step of maintaining said list comprises the step of providing an interface for a user of the portable subscriber unit to specify the plurality of devices which are to be connected quickly through the wide area network.

7. The method of claim 1, further comprising the step of determining that the sending and transmitting steps are not necessary when the comparing step indicates that the new LAN and the old LAN are sub-networks of a single LAN.

8. The method of claim 1,
wherein the identifier of the new LAN is an IP subnet identifier of the new LAN, and
wherein the identifier of the most recently connected old LAN is an IP subnet identifier of the most recently connected old LAN.

9. A portable subscriber unit for minimizing a connection setup time in a communication network comprising a wide area network, the portable subscriber unit comprising:
a processor for controlling the portable subscriber unit, the processor including a memory; and
a communication interface coupled to the processor for communicating with the communication network,
wherein the processor is arranged and programmed to:
maintain in the memory a list identifying a plurality of devices which are to be connected quickly through the communication network;
establish a new connection with the communication network; and
perform, in response to establishing said new connection, when necessary for pre-programming the communication network to minimize the connection setup time for subsequent connections with said plurality of devices, at least one of the steps of:
sending names of the plurality of devices to a domain name server (DNS) of the communication network to obtain Internet Protocol (IP) addresses corresponding to the name, thereby causing the DNS to cache the IP addresses of the devices for faster servicing of subsequent connections; and
transmitting a dummy IP packet to said plurality of devices,
wherein the processor is further arranged and programmed to:
establish the new connection via a new local area network (LAN); and
compare an identifier of the new LAN with a previously stored identifier of a most recently connected old LAN, and
prior to the performing step, determine that the sending and transmitting steps are not necessary when the identifier of the new LAN is equal to the previously stored identifier of a most recently connected old LAN.

10. The portable subscriber unit of claim 9, wherein the processor is further arranged and programmed to perform both the sending step and the transmitting step.

11. The portable subscriber unit of claim 9, wherein the processor is further arranged and programmed to repeat at least one of the sending and transmitting steps with regard to ones of said plurality of devices with which the portable subscriber unit has not communicated for a predetermined length of time.

12. The portable subscriber unit of claim 9, wherein the processor is further arranged and programmed to maintain said list by identifying a subset of devices with which the portable subscriber unit has recently communicated.

13. The portable subscriber unit of claim 9, wherein the processor is further arranged and programmed to maintain said list by identifying a predetermined number of devices with which the portable subscriber unit has most frequently communicatcd over a predetermined time period.

14. The portable subscriber unit of claim 9, further comprising
a user interface coupled to the processor for interfacing with a user, and
wherein the processor is further arranged and programmed to cooperate with the user interface to maintain said list by allowing a user of the portable subscriber unit to specify the plurality of devices which are to be connected quickly through the wide area network.

15. The portable subscriber unit of claim 9, wherein the processor is further arranged and programmed to determine that the sending and transmitting steps are not necessary when the comparing step indicates that the new LAN and the old LAN are sub-networks of a single LAN.

16. The portable subscriber unit of claim 9,
wherein the identifier of the new LAN is an IP subnet identifier of the new LAN, and
wherein the identifier of the most recently connected old LAN is an IP subnet identifier of the most recently connected old LAN.

* * * * *